US008259685B2

(12) United States Patent
Kawabata

(10) Patent No.: US 8,259,685 B2
(45) Date of Patent: Sep. 4, 2012

(54) WIRELESS COMMUNICATION METHOD, WIRELESS BASE STATION, WIRELESS TERMINAL, AND WIRELESS COMMUNICATION SYSTEM

(75) Inventor: Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 821 days.

(21) Appl. No.: 12/272,332

(22) Filed: Nov. 17, 2008

(65) Prior Publication Data

US 2009/0238149 A1 Sep. 24, 2009

(30) Foreign Application Priority Data

Mar. 18, 2008 (JP) .................... 2008-069101

(51) Int. Cl.
*H04W 4/00* (2009.01)
(52) U.S. Cl. .................. 370/332; 370/335
(58) Field of Classification Search ............ 370/335, 370/332
See application file for complete search history.

(56) References Cited

U.S. PATENT DOCUMENTS

| 6,157,626 | A | 12/2000 | Nakamura et al. | |
|---|---|---|---|---|
| 6,778,521 | B1 * | 8/2004 | Korpela et al. | 370/345 |
| 7,227,836 | B2 | 6/2007 | Kong et al. | |
| 2004/0180695 | A1 | 9/2004 | Sano | |
| 2007/0270151 | A1 | 11/2007 | Claussen et al. | |
| 2009/0046665 | A1 * | 2/2009 | Robson et al. | 370/332 |

FOREIGN PATENT DOCUMENTS

| JP | 09327059 | 12/1997 |
|---|---|---|
| JP | 2000-513547 | 10/2000 |
| JP | 2003101473 | 4/2003 |
| JP | 2003163631 | 6/2003 |
| JP | 2006229318 | 8/2006 |
| JP | 2006-261722 | 9/2006 |
| JP | 2006-295643 | 10/2006 |
| JP | 2006287601 | 10/2006 |
| JP | 2009542043 | 11/2009 |
| WO | 2007139680 | 12/2007 |

OTHER PUBLICATIONS

Communication from European Patent Office dated May 20, 2009, including Extended European Search Report and written Abstract to the European Search Report on European Patent Application No. 08170150.0, dated Apr. 29, 2009.
Abeta et al; "Channel Activation with Adaptive Coding Rate and Processing Gain Control for Cellular DS/CDMA Systems"; Vehicular Technology Conference, 1996; Mobile Technology for the Human Race., IEEE 46th Atlanta,GA, USA, Apr. 28-May 1, 1996. New York, NY, USA, IEEE, US, vol. 2; Dated Apr. 28, 1996; pp. 1115-1119. [Ref: European Search Report].

(Continued)

*Primary Examiner* — Sai-Ming Chan
(74) *Attorney, Agent, or Firm* — Myers Wolin, LLC

(57) ABSTRACT

A first wireless base station providing a first wireless zone encodes a first signal to be transmitted to the first wireless zone at a first coding rate, and transmits the signal at a first transmitting power to the first wireless zone. A second wireless base station belonging to the first wireless zone and providing a second radio zone encodes a second signal common with the first signal at a second coding rate, and transmits the signal at a second transmitting power to the second wireless zone.

9 Claims, 8 Drawing Sheets

OTHER PUBLICATIONS

Holger Claussen Ed; "Performance of Macro- and Co-Channel Femtocells in a Hierarchical Cell Structure"; The 18th Annual IEEE International Symposium on Personal, Indoor and Mobile Radio Communications. PIMRC 07; Dated Sep. 1, 2007. [Ref: European Search Report].

3GPP TR 25.820 V1.0.0 (Nov. 2007) 3rd Generation Partnership Project;Technical Specification Group Radio Access Networks; 3G Home NodeB Study Item Technical Report (Release 8).

3GPP TS 25.214 V8.0.0 (Nov. 2007) 3rd Generation Partnership Project; Technical Specification Group Radio Access Network; Physical Layer Procedures (FDD) (Release 8).

Official Office Action issued by the Japanese Patent Office corresponding to Japanese Patent Application No. 2008069101 mailed Jan. 17, 2012 with English Translation.

* cited by examiner

FIG. 7

| CODE GROUP | TRANSMISSION SOURCE |
|---|---|
| #0 | BS30 |
| #1 | BS30 |
| #2 | BS30 |
| #3 | BS30 |
| #4 | BS30 |
| #5 | BS30 |
| #6 | BS30 |
| #7 | BS30 |
| #8 | BS30 |
| #9 | BS30 |
| #10 | HOME-NB10 |
| #11 | HOME-NB10 |
| #12 | HOME-NB10 |
| #13 | HOME-NB10 |
| #14 | HOME-NB10 |
| #15 | HOME-NB10 |

WIRELESS COMMUNICATION METHOD, WIRELESS BASE STATION, WIRELESS TERMINAL, AND WIRELESS COMMUNICATION SYSTEM

CROSS-REFERENCE TO RELATED APPLICATION(S)

This application is based upon and claims the benefit of priority of the prior Japanese Application No. 2008-69101 filed on Mar. 18, 2008 in Japan, the entire contents of which are incorporated by reference.

BACKGROUND

1. Field

The embodiment(s) discussed herein is directed to a wireless communication method, a wireless base station, a wireless terminal and a wireless communication system. The embodiment(s) is may be used for a wireless communication system using a small-sized base station called femtocells.

2. Description of the Related Art

There is Home NodeB (Home-NB) as one of wireless communication techniques discussed in 3rd generation Partnership Project (3GPP). Home-NB is called femtocell from the viewpoint of radius of a formable wireless zone (cell) thereof.

The Home-NB can form a smaller-sized wireless service zone (cell) than those of existing wireless base stations. The Home-NB can be installed in a wireless wave shadowed zone such as house (interior), internal floor of office building, underground or the like within a service zone of a cellular system with an objective to expand the wireless service zone, for example. The Home-NB can be connected to an apparatus (an upper node) that controls existing wireless base stations with the use of Local Area Network (LAN), Asymmetric Digital Subscriber Line (ADSL), optical fibers or the like.

As known examples relating to the wireless communication techniques, documents below are cited:

[Patent Document 1] Japanese Patent Application Laid-Open Publication No. 2006-261722

[Patent Document 2] Published Japanese Translation of PCT International Publication for Patent Application No. 2000-513547

[Patent Document 3] Japanese Patent Application Laid-Open Publication No. 2006-295643

[Non-Patent Document 1] 3GPP TR 25.820 v1.0.0

[Non-Patent Document 2] 3GPP TS 25.214 v8.0.0

In a wireless communication system using such a Home-NB, the transmission wireless wave (radio signal) from the Home-NB can interfere with a transmission wireless wave from an existing wireless base station.

SUMMARY

For example, exemplary embodiment(s) uses the following.

(1) According to an exemplary embodiment, there is provided a wireless communication method in a wireless communication system comprising a first wireless base station, a second wireless base station and a wireless terminal being able to communicate with the first wireless base station or the second wireless base station, the wireless communication method comprising encoding a first signal to be transmitted to a first wireless zone at a first coding rate in the first wireless base station providing the first wireless zone, and transmitting the first signal at a first transmitting power from the first wireless base station to the first wireless zone, and encoding a second signal on a common channel to the first signal at a second coding rate in the second wireless base station belonging to the first wireless zone and providing a second wireless zone, and transmitting the second signal at a second transmitting power from the second wireless base station to the second wireless zone.

(2) According to an exemplary embodiment, there is provided a wireless base station in a wireless communication system comprising a first base station providing a first wireless zone, the wireless base station belonging to the first wireless zone and providing a second wireless zone, and a wireless terminal being able to communicate with the first wireless base station or the wireless base station, the wireless base station comprising an encoder that encodes, at a second coding rate, a second signal to be transmitted from the wireless base station to the second wireless zone on a common channel to a first signal transmitted from the first wireless base station to the first wireless zone, and a transmitter that transmits the second signal encoded by the encoder at a second transmitting power.

(3) According to an exemplary embodiment, there is provided a wireless terminal in a wireless communication system comprising a first wireless base station providing a first wireless zone, a second wireless base station belonging to the first wireless zone and providing a second wireless zone, and the wireless terminal being able to communicate with the first wireless base station or the second wireless base station, the wireless terminal comprising a receiver that is able to receive a first signal encoded at a first coding rate by the first wireless base station and transmitted at a first transmitting power from the first wireless base station to the first wireless zone, and a second signal on a common channel to the first signal encoded at a second coding rate by the second base station and transmitted at a second transmitting power from the second wireless station to the second wireless zone, and a decoder that decodes the first signal received in the first wireless zone by the receiver according to the first coding rate, while decoding the second signal received in the second wireless zone by the receiver according to the second coding rate.

(4) According to an exemplary embodiment, there is provided a wireless communication system comprising a first wireless base station that provides a first wireless zone, a second wireless base station that belongs to the first wireless zone and provides a second wireless zone, a first transmitter that encodes a first signal at a first coding rate and transmits the first signal at a first transmitting power to the first wireless zone, a second transmitter that encodes a second signal on a common channel to the first signal at a second coding rate and transmits the second signal at a second transmitting power to the second wireless zone, and a wireless terminal that receives the first signal and the second signal, and decodes the first signal and the second signal according to the first coding rate and the second coding rate, respectively.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 7 is a diagram illustrating an example of allocation of code groups of second synchronization codes used in cell search.

DESCRIPTION OF EMBODIMENT(S)

Figure 1:
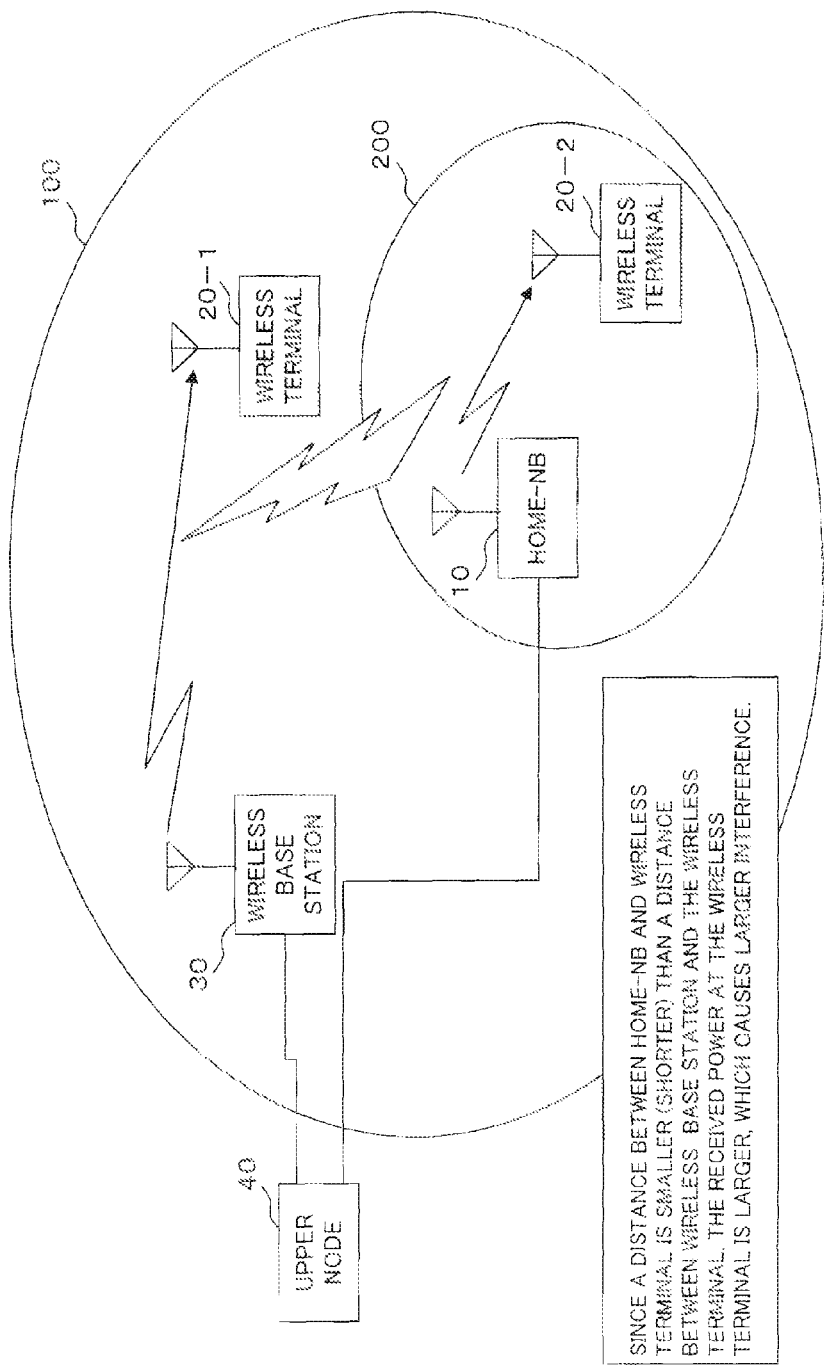
FIG. 1 is a block diagram illustrating an example of configuration of a wireless communication system according to an embodiment.

Hereinafter, an embodiment will be described referring to the drawings. The embodiment described below is only an example and it is not intended to exclude various modifications and applications of techniques not specified below. Namely, the embodiment can be performed variously modified (for example, in combination of the respective embodiment and the like) within the range not departing from the spirit.

[1] Embodiment

FIG. 1 is a block diagram illustrating an example of configuration of a wireless communication system according to an embodiment. The wireless communication system illustrated in FIG. 1 has a Base Station (BS, wireless base station) 30 providing a first wireless service zone (cell or sector) 100, and a first User Equipment (UE, wireless terminal) 20-1 being able to communicate with the BS 30 in a wireless link within the wireless service zone 100 of the BS 30. Within the wireless service zone 100 of the BS 30, installed is a Home NodeB (Home-NB) 10 providing a second wireless service zone (cell or sector), for example. Within the wireless service zone 200 of the Home-NB 10, a second UE 20-2 can communicate with the Home-NB 10 in a wireless link. The BS 30 and the Home-NB 10 are connected to an upper node 40 that can manage and control the BS 30 and the Home-NB 10, separately, for example. Each of the UE 20-1 and the UE 20-2 can communicate with the BS 30 in the wireless service zone 100 of the BS 30, and also can communicate with the Home-NB 10 in the wireless service zone 200 of the Home-NB 10. Hereinafter, when the UE 20-1 and the UE 20-2 are not discriminated from each other, the UE 20-1 and the UE 20-2 are simply referred to as UE 20. The number of the BS 30, the Home-NB 10 and the UE 20 are not limited to those illustrated in FIG. 1.

The BS (first wireless base station) 30 has a function of transmitting a wireless signal to the UE 20 positioned within the wireless service zone 100 from a transmitting antenna (not illustrated) of the BS 30, for example.

The wireless service zone 100 of the BS 30 has a radius of about several hundreds meters to several tens kilometers, for example. There are some cases where the wireless service zone 100 is divided into a plurality of sectors.

The UE 20 has a function of communicating with the BS 30 or the Home-NB 10 over a wireless link in the wireless service zone 100 or 200 formed by the BS 30 or the Home-NB 10.

The wireless link includes a downlink (DL) in a direction from the BS 30 or the Home-NB to the UE 20 and an uplink (UL) in the opposite direction, each of which can include a control CH and a data CH. A wireless resource (frequency, timing) used in the wireless link by the UE 20 can be allocated (designated) in scheduling by the BS 30 or the Home-NB 10.

The upper node 40 is an entity of a core network such as an IP network or the like, having a function of managing and controlling the BS 30 and Home-NB 10, and being able to communicate with the UE 20 via the BS 30 and the Home-NB 10.

The upper node 40 in this example can collect various kinds of information and the like from the BS 30 and the Home-NB 10, for example, and can notify another BS 30 or another Home-NB 10 of the information.

The Home-NB (second wireless base station) 10 transmits a wireless signal to the wireless service zone 200. The Home-NB 10 is connected to the upper node 40 by using LAN, ADSL or optical fibers, for example, to be able to transmit/receive signals such as control signal, user data, etc. to/from the upper node 40. Incidentally, the Home-NB 10 is installed in a zone (wireless wave shadowed zone such as underground, interior or the like) where the wireless wave from the BS 30 does not reach or hardly reaches, for example, to be able to compensate and expand the wireless service zone 100. Whereby, even when the UE 20-2 is positioned in a wireless wave blind zone of the wireless service zone 100 of the BS 30, the UE 20-2 can be provided a communication service similar to the communication service provided from the BS 30 so long as the UE 20-2 is positioned within the wireless service zone 200 of the Home-NB 10.

The BS 30 and the Home-NB 10 in this example can broadcast various kinds of control information to the UE 20 with the use of either one or both of Broadcast Channel (BCH) and Paging Channel (PCH) as an example of common control channels in the DL.

BCH is a control channel used to broadcast information used by the UE 20 to identify the wireless service zone 100 or 200 and information inherent with the system to the UE 20, whereas PCH is a control channel used to broadcast the same information to the UEs 20 in the wireless service zone s 100 and 200.

Each of the BS 30 and the Home-NB 10 encodes a signal on the above common control channel (hereinafter, referred to as a common control signal or a control signal) addressed to the UE 20 at a predetermined coding rate, thereafter, transmits the signal to the UE 20 at a predetermined transmitting power. Incidentally, the coding rate signifies a ratio (rate) of "the number of bits after coding" to "the number of bits before coding".

As illustrated in FIG. 1, when a certain wireless terminal 20-1 is positioned in a place away from the BS 30 and close to the wireless service zone 200 of the Home-NB 10, the transmitting power from the Home-NB 10 tends to be larger than the transmitting power from the BS 30 in such place. In such case, the common control signal transmitted from the Home-NB 10 to the UE 20-2 is liable to interfere with the common control signal transmitted from the BS 30 to the UE 20-1. Incidentally, the common control signal (BCH/PCH signal) transmitted from the BS 30 is an example of first signal, whereas the common control signal (BCH/PCH signal) transmitted from the Home-HB 10 is an example of second signal as common as the above-mentioned first signal.

There could be a case where all the UEs 20 in the wireless service zone 100 of the BS 30 are positioned within the wireless service zone 200 of the Home-NB 10, which seems to be rare. Since the number of UEs 20 that can simultaneously connect to the Home-NB 10 is limited, it is general that there is a UE 20 that cannot connect to the Home-NB 10 even when positioned in the wireless service zone 200 of the Home-NB 10. In such case, the UE 20 that cannot connect to the Home-NB 10 can try to receive the common control signal from the BS 30, but the rate of failure to receive the signal tends to increase because the transmitted wireless wave from the Home-NB 10 interferes with the reception.

In the wireless communication system in this example, the BS 30 encodes the control signal at a first coding rate in the wireless service zone 100 and transmits the control signal to the UE 20-1 at a first transmitting power, whereas the Home-NB 10 encodes a control signal at a second coding rate lower than the first coding rate in the wireless service zone 200 and transmits the control signal to the UE 20-2 at a transmitting power lower than the first transmitting power.

The control signal from the Home-NB 10 is transmitted at a power lower than the transmitting power of the control signal transmitted from the BS 30, but the control signal from the Home-NB 10 is encoded at a coding rate lower than that of the control signal from the BS 30, which improves the error resistance. In other words, by decreasing the coding rate of the control signal at the Home-NB 10 (in the wireless service zone 200) (that is, by decreasing the transmission rate), it becomes possible to decrease the transmitting power for which the UE 20 to appropriately receive the control signal.

Therefore, it is possible to prevent the control signal transmitted from the Home-NB 20 from interfering with the control signal transmitted from the BS 30, while suppressing degradation of the receive characteristic in the wireless service zone 200 of the Home-NB 10.

When the Home-NB 10 which uses a coding rate differing from (smaller than) a coding rate used by the BS 30 exists within the wireless service zone 100 of the BS 30 as above, it is preferable that the UE 20 know, by any means, the coding rate used to encode the control signal by the Home-NB 10 in order to appropriately receive and decode the control signal transmitted in the wireless service zone 200 of the Home-NB 10.

If the coding rate used by the Home-NB 10 is the same as every Home-NB 10, it is possible to beforehand give information about the coding rate to the UE 20. Alternatively, it is preferable that the BS 30 notify the UE 20 of presence of the Home-NB 10 and the coding rate used by the Home-NB 10. For example, the BS 30 can broadcast presence of the Home-NB 10 and the coding rate used by the Home-NB 10 over a broadcast channel or the like within the wireless service zone 100 of the BS 30.

Still alternatively, it is possible to define a cell search (synchronization detection) method (channel over which a known signal pattern used for cell search is transmitted) according to the coding rate between the BS 30 and the Home-NB 10, and perform plural kinds of defined cell search by the UE 20. Whereby, the UE 20 can recognize the coding rate of the control signal in the DL in each of the wireless service zone s 100 and 200 in the stage of cell search.

Still alternatively, the channel (known signal pattern) for cell search may be common irrespective of the coding rates used by the BS 30 and the Home-NB 10, and attribute information (information indicating the BS 30 or the Home-NB 10) of one bit or more may be given to a code pattern used in a process in the second stage of multi-stage cell search. Whereby, the UE 20 can discriminate between the control signal (first coding rate) transmitted from the BS 30 and the control signal (second coding rate) transmitted from the Home-NB 10, in the course of the multi-stage cell search.

[2] As to Practical Example of Wireless Communication System

Hereinafter, description will be made of a detailed example of the above-described wireless communication system.
(2.1) Embodiment
(2.1.1) As to BS 30

Figure 2:
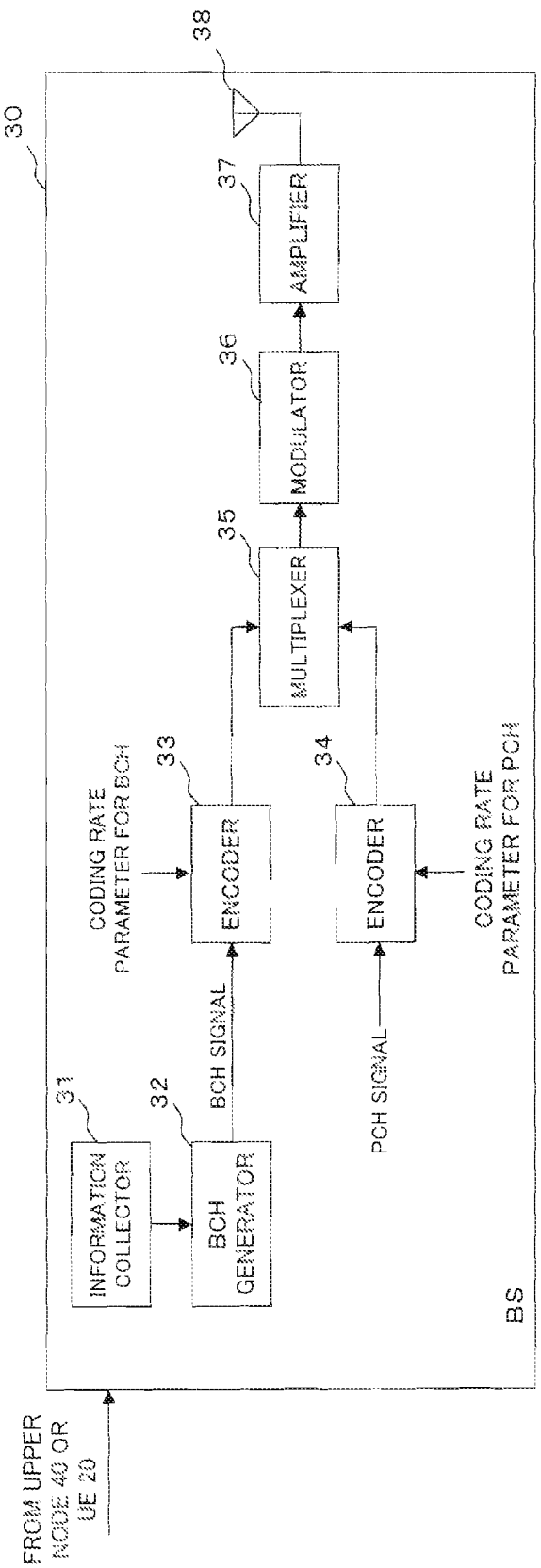
FIG. 2 is a block diagram illustrating an example of configuration of a BS in FIG. 1.

FIG. 2 is a block diagram illustrating an example of configuration of the BS 30. The BS 30 illustrated in FIG. 2 has an information collector 31, a BCH generator 32, encoders 33 and 34, a multiplexer 35, a modulator 36, an amplifier 37 and a transmitting antenna 38, for example.

The information collector 31 collects various kinds of information about the Home-NB 10 positioned within the wireless service zone 100 of the BS 30. For example, the information collector 31 in this example communicates with the upper node 40 to be able to collect either one or each of these kinds of information, that is, information about a position of the Home-NB 10 (existence/non-existence information about whether the Home-NB 10 exists in the wireless service zone 100) and/or information indicating a coding rate (second coding rate) in the Home-NB 10. Alternatively, the information collector 31 may communicate with the Home-NB 10 within the wireless service zone 100 to collect the above information directly from the Home-NB 10.

The BCH generator 32 generates a BCH signal containing the above information collected by the information collector 31.

The encoder 33 encodes the BCH signal generated by the BCH generator 31 and to be transmitted to the wireless service zone 100 in a predetermined coding system (for example, turbo coding, convolution coding or the like). The encoder 33 encodes the above BCH signal with a coding rate parameter for BCH (first coding rate) of a semi-fixed value beforehand defined in the wireless communication system, for example.

The encoder 34 encodes the PCH signal to be transmitted to the wireless service zone 100 in a predetermined coding system (for example, turbo coding, convolution coding or the like). The encoder 34 encodes the above PCH signal with a coding rate parameter for PCH (first coding rate) of a semi-fixed value beforehand defined in the wireless communication system, as well, for example.

Namely, the encoders 33 and 34 together function as a first encoder which encodes a common control signal (BCH signal, PCH signal and the like) addressed to a plurality of UEs 20 at the first coding rate.

The multiplexer 35 multiplexes the BCH signal and the PCH signal encoded at the first coding rate by the encoders 33 and 34. In multiplexing, any one of or a combination of two or more of time division multiplexing, frequency division multiplexing, and code division multiplexing can be used, for example.

The modulator 36 has a function of modulating a control signal multiplexed by the multiplexer 35 in a predetermined modulation system (for example, PSK (Phase Shift Keying), QAM (Quadrature Amplitude Modulation) or the like). In FIG. 2, omitted is part of blocks relating to the transmitting process such as a DA converter DA-converting the modulation signal, a frequency converter frequency-converting the signal to a wireless frequency (up conversion) and the like.

The amplifier 37 amplifies the signal modulated by the modulator 36 to a predetermined transmitting power (first transmitting power). Incidentally, the first transmitting power can be a semi-fixed value beforehand defined in the wireless communication system.

The transmitting antenna 38 transmits a wireless signal amplified by the amplifier 37 to the wireless service zone 100.

The encoders 33 and 34, the multiplexer 35, the modulator 36, the amplifier 37 and the transmitting antenna 38 together function as an example of first transmitter which encodes a first signal at a first coding rate and transmits the encoded signal at a first transmitting power to the first wireless zone.

Figure 5:
FIG. 5 is a diagram illustrating an example of operation of the BS in FIG. 1.

Now, an example of operation of the above-described BS 30 will be described. As illustrated in FIG. 5, the information collector 31 collects information about the Home-NB 10 positioned within the wireless service zone 100 of the BS 30 (Step S1).

The BCH generator 32 generates a BCH signal containing the information collected at Step S1 (Step S2). The BCH signal is encoded at the first coding rate by the encoder 33, thereafter, undergone the multiplexing, modulating and amplifying processes by the multiplexer 35, the modulator 36 and the amplifier 37, and transmitted to the UE 20 at the first transmitting power (Step S3).

The first coding rate and the first transmitting power are known to the UE 20 and the Home-NB 10 if the first coding rate and the first transmitting power are semi-static values.

With respect to a second coding rate to be described later used in the coding process at the Home-NB 10, the BS 30 can collect information about the second coding rate from the upper node 40 or the Home-NB 10, and notify the UE 20 of the second coding rate with the use of the BCH signal. Whereby, the UE 20 can find the second coding rate.

(2.1.2) As to Home-NB 10

Figure 3:
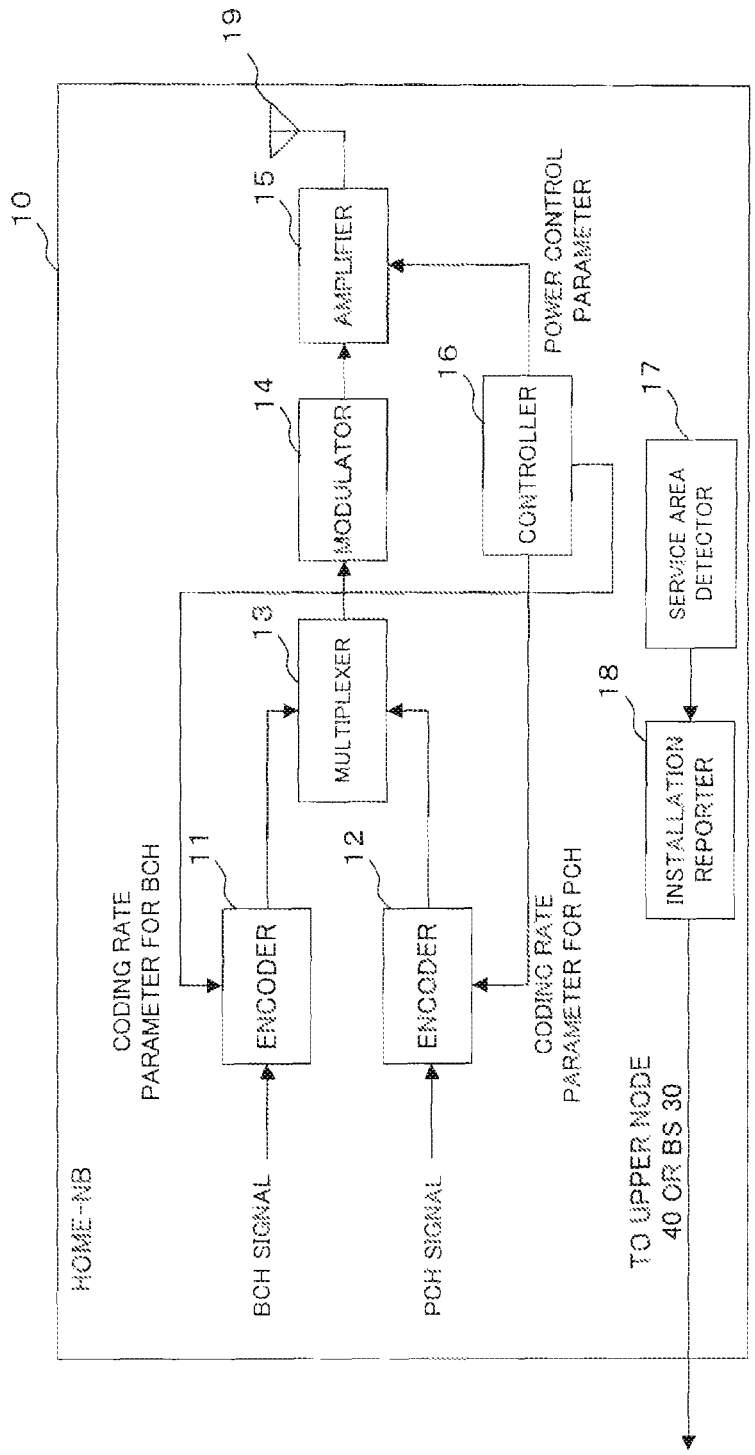
FIG. 3 is a block diagram illustrating an example of configuration of a Home-NB in FIG. 1.

FIG. 3 is a block diagram illustrating an example of configuration of the Home-NB 10. The Home-NB 10 has encoders 11 and 12, a multiplexer 13, a modulator 14, an amplifier 15, a controller 16, a service zone detector 17, a installation reporter 18 and a transmitting antenna 19, for example.

The encoder 11 encodes a BCH signal to be transmitted to the wireless service zone 200 in a predetermined coding system (for example, turbo coding, convolution coding or the like).

The encoder 12 encodes a PCH signal to be transmitted to the wireless service zone 100 in a predetermined coding system (for example, turbo coding, convolution coding or the like).

The coding rate (parameters) at these encoders 11 and 12 are given from the controller 16, for example. In other words, a coding rate parameter for BCH is given to the encoder 11 from the controller 16, whereas a coding rate parameter for PCH is given to the encoder 12 from the same. These coding parameters (second coding rate) are set to values smaller than the coding rate at the BS 30, for example.

The encoders 11 and 12 together function as an encoder which encodes a control signal (BCH signal, PCH signal, etc.) addressed to a plurality of UEs 20 at a second coding rate lower than the first coding rate. Since the second coding rate is a smaller value than that of the above first coding rate, data encoded at the second coding rate has relatively large error resistance as compared with data encoded at the first coding rate.

The multiplexer 13 multiplexes the control signals encoded by the encoders 11 and 12. In multiplexing, any one of or a combination of two or more of time division multiplexing, frequency division multiplexing and code division multiplexing can be used, for example.

The modulator 14 modulates the control signal multiplexed by the multiplexer 13 in a predetermined modulation system (for example, PSK, QAM or the like). Incidentally, part of blocks relating to the transmitting process such as a DA converter DA-converting the modulated signal, a frequency converter performing frequency-conversion to a wireless frequency (up conversion) and the like is omitted in FIG. 3.

The amplifier (transmitter) 15 amplifies the signal modulated by the modulator 14 to a predetermined transmitting power (second transmitting power). The amplification factor at the amplifier 15 can be controlled by a power control parameter given from the controller 16, for example. Owing to the setting of the power control parameter, the second transmitting power can be controlled to be a transmitting power lower than a transmitting power of the control signal from the BS 30, for example. Therefore, it is possible to prevent the control signal (BCH signal, PCH signal and the like) transmitted from the Home-NB 10 from interfering with the control signal transmitted from the BS 30.

The transmitting antenna 19 transmits the wireless signal amplified by the amplifier 15 to the wireless service zone 200.

The controller 16 controls the coding rate at the encoders 11 and 12 with the use of the coding rate parameters as stated above, while controlling the amplification factor (that is, the transmitting power of the control signal) at the amplifier 15 with the use of the power control parameter.

The service zone detector 17 judges whether its own station (Home-NB) 10 is positioned within the wireless service zone 100 or not. As an example of the judging method, the received signal strength (for example, signal to interference ratio; SIR) of a known signal having a pattern which differs from BS 30 to BS 30, transmitted from the BS 30 is measured. Alternatively, the service zone detector 17 may autonomously detect a wireless service zone within which its own station (Home-NB) 10 is positioned to perform the above judgment, like cell search to be described later performed by the UE 20, for example. Still alternatively, the service zone detector 17 may perform the above judgment on the basis of base station information (position information about the BS 30, information about the wireless service zone 100, etc.) notified from the BS 30 and position information about its own station 10 that can be measured by global positioning system (GPS).

The installation reporter 18 reports (notifies) the BS 30 or the upper node 40 of either one or both of position information (existence/non-existence information) about its own station (Home-NB) 10 and information indicating the second coding rate used at the encoders 11 and 12 on the basis of a result of the judgment by the above-mentioned service zone detector 17.

The encoders 11 and 12, the multiplexer 13, the modulator 14, the amplifier 15, the controller 16 and the transmitting antenna 19 together function as an example of a second transmitter which transmits a second signal common with the above-mentioned first signal at the second coding rate and transmit the second signal at the second transmitting power to the second wireless zone.

Accordingly, the BS 30 can grasp existence of the Home-NB 10 within the wireless service zone 100 of its own station 30 reported from the Home-NB 10 and the coding rate used at the Home-NB 10, directly or via the upper node 40, and notify (for example, broadcast) the UE 20 positioned within the wireless service zone 100 of these pieces of information.

(2.1.3) As to UE 20

Figure 4:
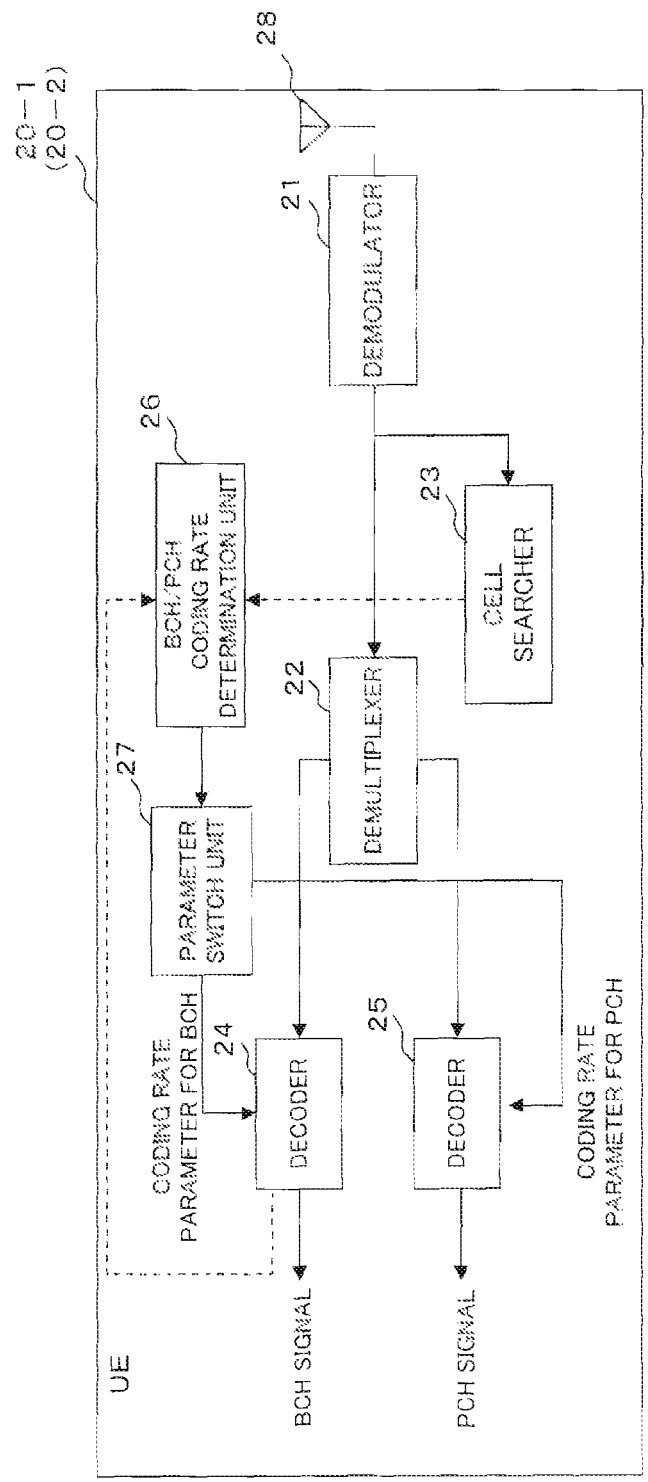
FIG. 4 is a block diagram illustrating an example of configuration of a UE in FIG. 1.

Next, description will be made of an example of configuration of the UE 20 with reference to FIG. 4. The UE 20 illustrated in FIG. 4 has a receiving antenna 28, a demodulator 21, a demultiplexer 22, a cell searcher 23, decoders 24 and 25, a BCH/PCH coding rate determination unit 26 and a parameter switch unit 27, for example.

The receiving antenna 28 is a wireless interface which receives a wireless signal transmitted from the BS 30 or a wireless signal transmitted from the Home-NB 10.

The demodulator (receiver) 21 demodulates a wireless signal from the BS 30 or the Home-NB 10 received by the receiving antenna in a demodulation system corresponding to the modulation system at the transmitting side (BS 30 or Home-NB 10).

The demultiplexer 22 demultiplexes the wireless signal demodulated by the demodulator 21 into the BCH signal and the PCH signal (that is, demultiplexes into channels), which is an example of the control signal. The demultiplexer 22 in this example performs signal-demultiplexing in a demultiplexing system corresponding to a multiplexing system at the multiplexer 35 in the BS 30 or the multiplexer 13 in the Home-NB 10 to demultiplex the signal into the BCH signal and the PCH signal.

The cell searcher (first cell search unit) 23 searches (cell search) in the wireless service zone 100 of the BS 30 or the wireless service zone 200 of the Home-NB 10 on the basis of a demodulated signal of the demodulator 21 to establish synchronization (frame synchronization) with a wireless signal in the DL received from the BS 30 or the Home-NB 10. In the cell search, a known signal (for example, common pilot signal or the like) periodically broadcasted from the BS 30 or the Home-NB 10 may be used.

The known signal can be a signal having a pattern which differs from BS 30 to BS 30, or differs from Home-NB 10 to Home-NB 10. The UE 20 can beforehand store plural kinds of the pattern signal (replicas), and select one of the patterns whose receive quality (for example, receive level) is suitable or optimum as the one to be communicated with, that is, the BS 30 or the Home-NB 10.

By making the patterns of the known signal differ from one another according to the coding rates at the BS 30 and the Home-NB 10, the UE 20 can select (detect) a communication destination whose receive quality is suitable or optimum in the cell search, and identify the coding rate used in the communication destination.

In this case, it may be not to broadcast information about the position and the coding rate of the Home-NB 10 from the BS 30 to the UE 20. This broadcasting may be performed together with the above cell search. The identification of the coding rate may be performed in not the cell search but the broadcasting.

If the BS 30 performs the broadcasting, the broadcasted information (coding rate parameters) may be contained in the BCH signal, for example. In such case, the UE 20 can detect the coding rate (parameters) at the BS 30 from the BCH signal decoded by the decoder 24, and give the detected coding rate parameters to the BCH/PCH coding rate determination unit 26.

The BCH/PCH coding rate determination unit 26 determines (selects) a coding rate (parameters) to be referred to when the decoders 24 and 25 decode a control signal (BCH signal, PCH signal) from the BS 30 and the Home-NB 10. The determined (selected) coding rate is a coding rate (parameters) detected by the cell searcher 23 (or the decoder 24), for example.

In other words, when the UE 20 is positioned within the wireless service zone 100 of the BS 30, the first coding rate (coding rate parameters for BCH/PCH) at the BS 30 is selected.

When the UE 20 is positioned within the wireless service zone 200 of the Home-NB 10, the second coding rate (coding rate parameters for BCH/PCH) at the Home-NB 10 is selected.

The selected coding rate for BCH/PCH (parameters) is given to the parameter switch unit 27.

The parameter switch unit 27 gives the coding rate parameters for BCH/PCH given from the BCH/PCH coding rate determination unit 26 to the respective decoders 24 and 25 to update (switch) the coding rate used at the decoders 24 and 25.

The decoder 24 decodes a BCH signal demultiplexed by the demultiplexer 22 according to a coding rate parameter for BCH given from the parameter switch unit 27 in a decoding system corresponding to the encoding system performed at the transmitting side (BS 30 or Home-NB 10).

The decoder 25 decodes a PCH signal demultiplexed by the demultiplexer 22 according to a coding rate parameter for PCH given from the parameter switch unit 27 in a decoding system corresponding to the encoding system performed at the transmitting side (BS 30 or Home-NB 10).

When the UE 20 is positioned within the wireless service zone 200 of the Home-NB 10 and selects the Home-NB 10 as the communication destination in the cell search, the decoders 24 and 25 together function as a decoder which decodes a received control signal (BCH signal, PCH signal, etc.) demodulated by the demodulator 21 at the second coding rate lower than the first coding rate at the BS 30.

Figure 6:
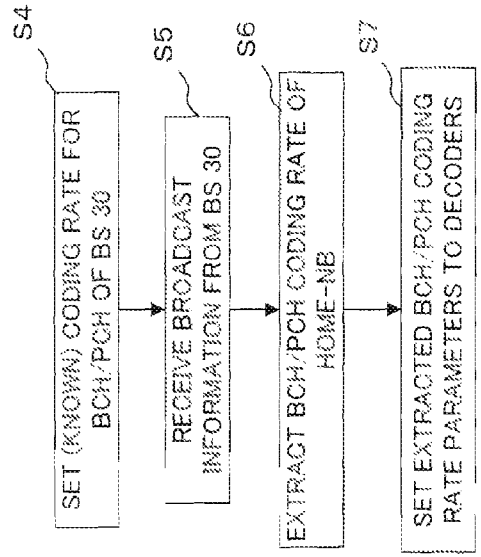
FIG. 6 is a diagram illustrating an example of operation of the UE in FIG. 1.

Next, an example of operation of the above-described UE 20 will be described with reference to FIG. 6. FIG. 6 illustrates a case where information (coding rate parameters) about the coding rate at the Home-NB 10 is broadcasted from the BS 30.

To begin with, the UE 20 sets the coding rate for BCH/PCH used at the decoders 25 and 25 to the known coding rate for BCH/PCH (first coding rate) in order to be able to receive and decode a control signal (BCH signal, PCH signal) transmitted from the BS 30 (Step S4). When the UE 20 receives a control signal transmitted from the BS 30 thereafter (Step S5), the decoders 24 and 25 decode the received control signal at the first coding rate. The decoded BCH signal contains position information about the Home-NB 10 and information (parameters) about the coding rate for BCH/PCH (second coding rate) used at the Home-NB 10, for example. These pieces of information are given to the BCH/PCH coding rate determination unit 26 (Step S6).

The BCH/PCH coding rate determination unit 26 judges whether or not its own station 20 is positioned within the wireless service zone 200 of the Home-NB 10 on the basis of the given position information about the Home-NB 10. When its own station 20 is positioned within the wireless service zone 200 of the Home-NB 10, the BCH/PCH coding rate determination unit 26 sets the second coding rate (parameters) obtained from the received BCH signal to the decoders 24 and 25 through the parameter switch unit 27. Whereby, the coding rate parameters at the decoders 24 and 25 are updated, thereafter, the UE 20 can appropriately decode the control signal (BCH signal, PCH signal) encoded at the second coding rate and transmitted from the Home-NB 10. When the coding rate (parameters) of the control signal at the Home-NB 10 is identified in the stage of cell search by the cell searcher 24 as described above, it may give the identified coding parameters to the BCH/PCH coding rate determination section 26.

Thereafter, the UE 20 decodes the received control signal with the use of the second coding rate parameters in the decoders 24 and 25 whenever receiving a control signal from the Home-NB 10 (Step S7).

As stated above, the UE 20 in this example can find the coding rate (second coding rate) of a control signal transmitted from the Home-NB 10 by receiving broadcasting from the BS 30.

Therefore, the UE 20 in this example can appropriately decode a control signal irrespective of whether the received control signal is a control signal having been encoded at the first coding rate and transmitted from the BS 30 or a control signal having been encoded at the second coding rate and transmitted from the Home-NB 10.

(2.2) Example of Operation of the Wireless Communication System

In the wireless communication system in this example, the BS 30 encodes a control signal (BCH signl, PCH signal, etc.) addressed to the UE 20-1 is positioned within the wireless service zone 100 at the first coding rate and transmits the control signal to the UE 20-1 at the first transmitting power. On the other hand, the Home-NB 10 encodes a control signal (BCH signal, PCH signal, etc.) addressed to the UE 20-2 is positioned within the wireless service zone 200 at the second coding rate lower than the first coding rate at the BS 30 (that is, of higher error resistance than the BS 30) and transmits the control signal to the UE 20-2 at the second transmitting power lower than the first transmitting power at the BS 30.

This makes it possible to prevent the control signal transmitted from the Home-NB 10 from interfering with the control signal transmitted from the BS 30. Since the coding rate of the control signal transmitted from the Home-NB 10 is made lower than the coding rate of the control signal transmitted from the BS 30 to decrease the transmission rate (increase the error resistance), it is possible to suppress degradation of the receive quality at the UE 20 although the transmitting power of the control signal transmitted from the Home-NB 10 is lower than the transmitting power of the control signal transmitted from the BS 30.

When the UE 20 is positioned within the wireless service zone 100 of the BS 30 and tries to connect to the BS 30, the UE 20 decodes a control signal received from the BS 30 on the basis of known coding rate parameters. When the UE 20 is positioned within the wireless service zone 200 of the Home-NB 10 and tries to connect to the Home-NB 10, the UE 20 decodes a control signal received from the Home-NB 10 on the basis of coding rate parameters broadcasted from the BS 30. As this, the UE 20 can appropriately select coding rate parameters suited to the wireless service zone 100 or 200 in which the UE 20 is positioned on the basis of broadcasted information from the BS 30, thereby to appropriately decode the control signal.

[3] First Modification

The above-described cell search unit 23 can adopt multistage cell search (for example, three-stage cell search) as an example of second cell search unit in order to accomplish faster cell search. In the three-stage cell search, the following processes are carried out, for example.

Process 1: detecting a primary synchronization channel and synchronizing with the slot timing Process 2: detecting a secondary synchronization channel and identifying a code group of scrambling codes Process 3: identifying a scrambling code In such the three-stage cell search, plural kinds of codes (patterns) are used. For example, primary synchronization code is used in the process 1 in the first stage, secondary synchronization code in the process 2 in the second stage, and scrambling code in the process 3 in the third stage.

Primary synchronization code has a code pattern common to the wireless service zone s 100 and 200. This signifies that a synchronization channel for cell search is set commonly to the wireless service zone s 100 and 200. 512 Scrambling codes are prepared, for example, divided into a plurality (64 kinds, each of eight codes, for example) of groups. 16 secondary synchronization codes are prepared, for example, and differences in slot allocation pattern among these 16 codes can indicate 64 code groups of the scrambling codes.

Namely, if synchronization of the slot timing can be detected through a correlation process with the use of the primary synchronization code in the process 1 in the first stage, it becomes possible to identify a slot allocation pattern allocated in synchronization with this slot timing, that is, identify a code group, by performing the correlation process with the use of the secondary synchronization codes. In the process 3 in the third stage, a scrambling code belonging to the identified code group is detected through correlation process with the use of the scrambling codes.

If 16 secondary synchronization codes to be used in the process 2 in the second stage are divided into two groups each according to the coding rate (parameters) of a control signal of the BS 30 and the coding rate (parameters) of a control signal of the Home-NB 10, the UE 20 can discriminate between the coding rate of the control signal used in the wireless service zone 100 of the BS 30 and the coding rate of the control signal used in the wireless service zone 200 of the Home-NB 10 in the process 2 in the second stage of the three-stage cell search.

For example, if the coding rates (parameters) at the BS 30 and the Home-NB 10 are fixed, the coding rates of control signals transmitted from the BS 30 and the Home-NB 10 can be discriminated, by grouping allocation of the secondary synchronization codes according to the transmission source (BS 30 or Home-NB 10).

FIG. 7 illustrates an example of this grouping. In FIG. 7, secondary synchronization codes of code group numbers #0 to #9 out of 16 secondary synchronization codes #0 to #15 are allocated to the BS 30, while secondary synchronization codes of code group numbers #10 to #15 are allocated to the Home-NB 10. This is equivalent to that one-bit information (attribute information) of a code group of the secondary synchronization codes grouped according to the transmission source is given to a synchronization channel common to the wireless service zones 100 and 200.

The cell searcher (second cell search unit) 23 has the above primary synchronization codes, secondary synchronization codes and scrambling codes, performs the correlation process using the secondary synchronization codes in the process 2 in the second stage to identify whether the communication destination is the BS 30 or the Home-NB 10 while identifying the code group, thereby identifying the code rate (parameters) of the control signal of the BS 30 or the Home-NB 10.

The coding rate parameters identified as above are given to the BCH/PCH coding rate determination unit 26. The BCH/PCH coding rate determination unit 26 sets the given coding rate parameters to the decoders 24 and 25 through the parameter switch unit 27.

Whereby, the UE 20 can appropriately receive and decode a control signal from the communication destination with the use of coding rate parameters according to the communication destination (BS 30 or Home-NB 10).

Therefore, the UE 20 can identify the coding rate (parameters) faster than the above-described embodiment.

In the above example, code groups of secondary synchronization codes are made according to the transmission source of control signals and allocated. Alternatively, it is possible to make the code groups of secondary synchronization codes according to the coding rate of the control signal. Incidentally, there is possibly a case where what is given to a secondary synchronization code (code group) as the attribute information is information of two or more bits.

[4] Second Modification

When the coding rate of a control signal transmitted from the Home-NB 10 is made lower (lower-rate) than the coding rate of a control signal transmitted from the BS 30, the information quantity (the number of bits) of the control signal transmitted from the Home-NB 10 is greater than the information quantity of the control signal transmitted from the BS 30. Accordingly, the Home-NB 10 has to map the control signal having an increased number of bits as a modulation signal by means of the modulator 14 illustrated in FIG. 3.

For this reason, it is convenient for the modulator 14 to increase the number of bits that can be mapped per unit time. For this purpose, the number of levels in multi-level modulation may be increased, but, a high Signal to Interference Ratio (SIR, signal to noise ratio) is required. In such case, it is preferable that the Home-NB 10 increase the transmitting power in order to guarantee the receive quality at the UE 20. However, an increase in transmitting power is against the original purpose that is to decrease the transmitting power of the Home-NB 10 to suppress the interference.

For this, the number of information bits of the control signal before encoded at the encoders 11 and 12 may be decreased. Namely, since the Home-NB 10 is an isolated cell in a certain sense, it is possible to delete peripheral cell information contained in the BCH signal, for example, to decrease the number of information bits of the BCH signal.

Figure 8:
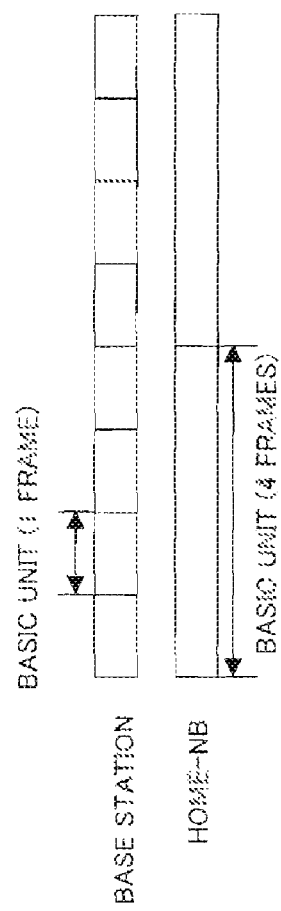
FIG. 8 is a diagram illustrating an example of transmission frame of the Home-NB in FIG. 1.

Alternatively, the unit time is made longer than the basic frame time used in the wireless communication system (for example, an integral multiple) to increase the number of bits that can be mapped as a modulation signal. As illustrated in FIG. 8, for example, if the unit time is increased from one-frame time to four-frame time, 40 bits can be mapped on the modulation signal, which are four times larger than ten bits of information that can be mapped on the modulation signal per one frame.

Accordingly, the Home-NB 10 can transmit, to the UE 20, the increased number of bits that are yielded by encoding the control signal at a coding rate lower than the coding rate of control signal at the BS 30, without changing the number of levels of the modulation system and the format of the basic frame, and without increasing the transmitting power.

In such case, it is preferable to notify the UE 20 that the unit time differs from the basic frame in order to allow the UE 20 to perform appropriate demodulating process. For example, information about the frame length can be notified to the UE 20 positioned in the wireless service zone 200 from the Home-NB 10. As the notifying method, the information about the frame length can be broadcasted as information accompanying information (coding rate, etc.) broadcasted from the BS 30 to the Home-NB 10 as stated above, or as independent information, for example.

Just as the coding rate is identified during the course of cell search as described above, information about the frame length can be identified. For example, a cell search (synchronization detection) method according to a transmission frame length (a channel on which a known signal pattern used for cell search is transmitted) is defined between the BS 30 and the Home-NB 10, the UE 20 performs plural kinds of defined cell search to identify the frame length. Alternatively, code groups of the secondary synchronization codes used in the process in the second stage of the third-stage cell search are made and allocated according to the frame lengths of the BS 30 and the Home-NB 10, whereby the UE 20 can identify the frame length in the process in the second stage of the third-stage cell search.

[5] Others

The processes performed in the Home-NB 10, the UE 20 and the BS 30 may be adopted or rejected, or suitably combined.

Other than the above examples, the second transmitting power may be lower than the first transmitting power, without changing the first coding rate and the second coding rate. In such case, the first and second coding rate may be the same.

Still alternatively, the first coding rate maybe lower than the second coding rate, without changing the first transmitting power and the second transmitting power. In such case, the first and second transmitting power may be the same.

In the wireless communication system, attention is paid to one BS 30 and one Home-NB 10 in the above examples. However, part of or all of a plurality of BSs 30 and part of or all of a plurality of Home-NBs 10 use different coding rates of the control signals and different transmitting powers.

Further, the Home-NB 10 may select a predetermined coding rate from among a plurality of coding rates lower than the first coding rate, and select a predetermined transmitting power from among a plurality of transmitting power values lower than the first transmitting power.

For example, the Home-NB 10 may suitably control the coding rate and the transmitting power according to a distance between the BS 30 and the UE 20-1, and a distance between the Home-NB 10 and the UE 20-1, etc. (that is, control to decrease the coding rate and the transmitting power as the distance is decreased). Alternatively, the Home-NB 10 may suitably control the coding rate and the transmitting power according to the received field intensity at the UE 20 (for example, control to decrease the coding rate and the transmitting power as the received field intensity is increased).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it may be understood that the various changes, substitutions, and alterations could be made hereto without departing from the spirit and scope of the invention.

The invention claimed is:

1. A wireless communication method in a wireless communication system comprising a first wireless base station, a second wireless base station and a wireless terminal being able to communicate with said first wireless base station or said second wireless base station, said wireless communication method comprising:

encoding a first signal to be transmitted to a first wireless zone at a first coding rate in said first wireless base station providing the first wireless zone, and transmitting the first signal at a first transmitting power from said first wireless base station to the first wireless zone; and encoding a second signal of a common channel to the first signal at a second coding rate lower than the first coding rate in said second wireless base station belonging to the first wireless zone and providing a second wireless zone, and transmitting the second signal at a second transmitting power from said second wireless base station to the second wireless zone, wherein a first code pattern for cell search according to the first coding rate is transmitted from said first wireless base station to the first wireless zone;

a second code pattern for cell search according to the second coding rate is transmitted from said second wireless base station to the second wireless zone; and either one of the first code pattern and the second code pattern is detected by said wireless terminal processing the cell search to allow said wireless terminal to discriminate between the first coding rate and the second coding rate.

2. A wireless communication method in a wireless communication system comprising a first wireless base station, a second wireless base station and a wireless terminal being able to communicate with said first wireless base station or said second wireless base station, said wireless communication method comprising:

encoding a first signal to be transmitted to a first wireless zone at a first coding rate in said first wireless base station providing the first wireless zone, and transmitting the first signal at a first transmitting power from said first wireless base station to the first wireless zone; and encoding a second signal of a common channel to the first signal at a second coding rate lower than the first coding rate in said second wireless base station belonging to the first wireless zone and providing a second wireless zone, and transmitting the second signal at a second transmitting power from said second wireless base station to the second wireless zone, wherein first information according to the first coding rate on a synchronization channel for cell search common to the first wireless zone and the second wireless zone is transmitted from said first wireless station to the first wireless zone;

second information according to the second coding rate on the synchronization channel for cell search common to the first wireless zone and the second wireless zone is transmitted from said second wireless base station to the second wireless zone; and the first coding rate and the second coding rate are discriminated from one another according to the first and second information given to the signal on the synchronization channel for cell search.

3. The wireless communication method according to claim 1, wherein the second signal encoded at the second coding rate is mapped onto a transmission frame having a frame length longer than a frame length used to transmit the first signal encoded at the first coding rate in said second wireless base station, and transmitted from said second wireless base station to the second wireless zone.

4. A wireless terminal in a wireless communication system comprising a first wireless base station providing a first wireless zone, a second wireless base station belonging to the first wireless zone and providing a second wireless zone, and said wireless terminal being able to communicate with said first wireless base station or said second wireless base station, said wireless terminal comprising:

a receiver that is able to receive a first signal encoded at a first coding rate by said first wireless base station and transmitted at a first transmitting power from said first wireless base station to the first wireless zone, and a second signal of a common channel to the first signal encoded at a second coding rate lower than the first coding rate by said second wireless base station and transmitted at a second transmitting power from said second wireless station to the second wireless zone; and a decoder that decodes the first signal received in the first wireless zone by said receiver according to the first coding rate, while decoding the second signal received in the second wireless zone by said receiver according to the second coding rate, wherein said receiver comprises:

a first cell searcher that detects either one of a first code pattern for cell search according to the first coding rate transmitted from said first wireless base station to the first wireless zone and a second code pattern for cell search according to the second coding rate transmitted from said second wireless base station to the second wireless zone, and gives the first coding rate or the second coding rate discriminated according to a detected code pattern to said decoder.

5. The wireless terminal according to claim 4, wherein the second transmitting power is lower than the first transmitting power.

6. A wireless terminal in a wireless communication system comprising a first wireless base station providing a first wireless zone, a second wireless base station belonging to the first wireless zone and providing a second wireless zone, and said wireless terminal being able to communicate with said first wireless base station or said second wireless base station, said wireless terminal comprising:

a receiver that is able to receive a first signal encoded at a first coding rate by said first wireless base station and transmitted at a first transmitting power from said first wireless base station to the first wireless zone, and a second signal of a common channel to the first signal encoded at a second coding rate lower than the first coding rate by said second wireless base station and transmitted at a second transmitting power from said second wireless station to the second wireless zone; and a decoder that decodes the first signal received in the first wireless zone by said receiver according to the first coding rate, while decoding the second signal received in the second wireless zone by said receiver according to the second coding rate, wherein said receiver further comprises:

a second cell searcher that detects either one of a first information according to the first coding rate on a synchronization channel for cell search common to the first wireless zone and the second wireless zone transmitted from said first wireless base station to the first wireless zone and second information according to the second coding rate on the synchronization channel for cell search common to the first wireless zone and the second wireless zone transmitted from said second wireless base station to the second wireless zone, and gives the first coding rate or the second coding rate discriminated according to the first and second information to said decoder.

7. The wireless terminal according to claim 4, wherein the first signal and the second signal are common control signals transmitted commonly to a plurality of wireless terminals in the wireless zones.

8. A wireless communication system comprising:

a first wireless base station that provides a first wireless zone;

a second wireless base station that belongs to the first wireless zone and provides a second wireless zone;

a first transmitter that encodes a first signal at a first coding rate and transmits the first signal at a first transmitting power to the first wireless zone;

a second transmitter that encodes a second signal of a common channel to the first signal at a second coding rate lower than the first coding rate and transmits the second signal at a second transmitting power to the second wireless zone; and a wireless terminal that receives the first signal and the second signal, and decodes the first signal and the second signal according to the first coding rate and the second coding rate, respectively, wherein said wireless terminal comprises:

a first cell searcher that detects either one of a first code pattern for cell search according to the first coding rate transmitted from said first wireless base station to the first wireless zone and a second code pattern for cell search according to the second coding rate transmitted from said second wireless base station to the second wireless zone, and uses the first coding rate or the second coding rate discriminated according to a detected code pattern at said decoding.

9. A wireless communication system comprising:

a first wireless base station that provides a first wireless zone;

a second wireless base station that belongs to the first wireless zone and provides a second wireless zone;

a first transmitter that encodes a first signal at a first coding rate and transmits the first signal at a first transmitting power to the first wireless zone;

a second transmitter that encodes a second signal of a common channel to the first signal at a second coding rate lower than the first coding rate and transmits the second signal at a second transmitting power to the second wireless zone; and a wireless terminal that receives the first signal and the second signal, and decodes the first signal and the second signal according to the first coding rate and the second coding rate, respectively, wherein said wireless terminal comprises:

a second cell searcher that detects either one of a first information according to the first coding rate on a synchronization channel for cell search common to the first wireless zone and the second wireless zone transmitted from said first wireless base station to the first wireless zone and second information according to the second coding rate on the synchronization channel for cell search common to the first wireless zone and the second wireless zone transmitted from said second wireless base station to the second wireless zone, and uses the first coding rate or the second coding rate discriminated according to the first and second information at said decoding.

* * * * *